United States Patent Office 2,899,326
Patented Aug. 11, 1959

2,899,326

WATER HARDENING MIXTURES

Donald H. Butler, Pittsburgh, Pa.

No Drawing. Application August 24, 1956
Serial No. 605,951

4 Claims. (Cl. 106—97)

This invention relates to water hardening mixtures, more particularly to water hardening mixtures including as an ingredient a calcium-containing cement such as Portland cement, plaster $((CaSO_4)_2H_2O)$, or aluminous cement $(CaO.Al_2O_3+2CaO.SiO_2)$. My invention consists in a mixture of a water hardening calcium-containing cement and calcined alumina in certain proportions by weight to the cement whereby some of the physical properties of both the wet and hardened cement are materially improved, particularly workability or placeability, strength, and heat conductivity.

This application is a continuation in part of my co-pending application, Serial No. 313,990, filed October 9, 1952, now abandoned.

I have found that, if calcined alumina is added to water hardening calcium-containing cements in proportions hereinafter stated, the workability, placeability, or ability of the cement to flow after a given amount of water is added is materially improved. Conversely, if calcined alumina is added to the cement, the same workability, placeability, or ability to flow can be obtained with less water than would otherwise be required. Reduction in the amount of water required to place and harden a calcium-containing cement, for example, Portland cement, produces important results. Reduction in the amount of water increases the strength of the hardened cement and its heat conductivity. I am not certain as to why the addition of calcined alumina materially improves certain of the physical properties of calcium-containing cements, but I believe that its effect is to produce a better distribution of the water through the cement. In any event, numerous tests and experiments which I have conducted establish that the physical properties are, in fact, improved.

I have found that calcined alumina should be added to cement in the proportion of from 2 to 15% by weight of the cement. I have also found that substantially all of the particle size of the calcined alumina particles should be at least as large as the cement particles to which the alumina is added. If the particle size of the alumina added is smaller than the particle size of the cement to which the alumina is added, then the alumina particles will coat the cement particles and prevent the proper combination of water and cement particles.

I have found that the commercial product known as calcined alumina has the proper characteristics for carrying out my invention. Calcined alumina is aluminum oxide which has been heated in a kiln to a temperature between 2000° F. and 2300° F. It has a crystalline structure and has a specific gravity varying from 3.6 to 3.9. A typical screen analysis of calcined alumina is:

| | Percent |
|---|---|
| On 100 mesh | 2–6 |
| On 200 mesh | 50–70 |
| On 325 mesh | 88–96 |
| Through 325 | 4–12 |

In order to determine the effect of calcined alumina on a simple mixture of Portland cement and water, I prepared a control mixture of cement and water in the proportions of 1500 grams of cement to 575 grams of water and measured the flow characteristics. I then prepared a mixture of cement and calcined alumina containing alumina in the proportion of 6% by weight of the cement. To the mixture of cement and alumina, I added water in varying amounts until I secured the same flow characteristics as the control sample. The flow characteristics were measured in accordance with the A.S.T.M. C–230–55T flow test method. The mixture was allowed to harden for seven days and then tested for strength. I obtained the following results:

TABLE I

| Mix | $Al_2O_3$ | Flow, percent | Strength in lbs./sq. in. after 7 days |
|---|---|---|---|
| 1,500 gr. cement, 575 gr. water | None | 67 | 1,650 |
| 1,500 gr. cement, 563 gr. water | 6% of cement. | 67 | 5,280 |

This test shows that, by addition of calcined alumina, I could obtain the same flow or placeability with less water. The test also shows that the strength of the hardened mixture was greatly increased.

In another series of tests using mixtures of Portland cement and crystalline alumina in the form of calcined alumina, I used a control mixture comprising 1500 grams of Portland cement and 575 grams of water and, to prepare the test samples, I added to this mixture calcined alumina in varying amounts. I also decreased the amount of water used in each test sample to prevent the samples to which alumina had been added from flowing so freely as to be unmeasurable. The samples were tested for flow and then allowed to harden for seven days and tested for strength. The results of the tests are set out in the following table:

TABLE II

| Mix | $Al_2O_3$, percent of cement by weight | Flow, percent | Strength in lbs./sq. in. after 7 days |
|---|---|---|---|
| 1,500 gr. cement, 575 gr. water | None | 67 | 1,650 |
| 1,500 gr. cement, 548 gr. water | 2 | 76 | 4,363 |
| Do | 3 | 92 | 5,223 |
| Do | 5 | 116 | 3,599 |
| Do | 6 | 116 | 5,100 |
| Do | 7 | 108 | 5,350 |
| Do | 8 | 112 | 6,370 |
| Do | 9 | 96 | 6,080 |

The foregoing table shows that the flow of the cement mixture was the greatest when the amount of the crystalline alumina in the form of calcined alumina added was 5 to 6% by weight of the cement. Thereafter it decreased. The strength, however, continued to increase.

I have also found that the presence of hard aggregates does not have any effect on the action of the alumina on the cement. By aggregates, I mean any hard, inert natural or manufactured material mixed in graduated fragments with a cementing material to form concrete, plaster, or the like. Aggregates conventionally used with Portland cement are sand, gravel, pearlite or slag or a combination of these materials, and the aggregate generally used with plaster is sand or pearlite.

Using a mixture of Portland cement, sand, and water,

I kept the water constant but added calcined alumina in varying amounts and obtained the results set out in the following table:

TABLE III

| Mix | Al₂O₃, percent of cement by weight | Flow, percent | Strength in lbs./sq. in. After 3 days | Strength in lbs./sq. in. After 7 days |
|---|---|---|---|---|
| 7# 1 oz. cement, 19# 7 oz. sand, 5# water | None | 40 | 1,576 | 2,211 |
| Do | 2 | 56 | 1,568 | 2,051 |
| Do | 3 | 44 | 1,632 | 2,013 |
| Do | 4 | 62½ | 1,578 | 2,406 |
| Do | 5 | 62 | 1,682 | 2,283 |
| Do | 6 | 60 | 1,647 | 2,540 |
| Do | 7 | 68 | 1,720 | 2,323 |
| Do | 8 | 58 | 1,682 | 2,446 |
| Do | 9 | 62 | 1,668 | 2,161 |
| Do | 11 | 54 | 1,760 | 2,628 |
| Do | 12 | 54 | 1,722 | 2,440 |
| Do | 13 | 50 | 1,746 | 2,715 |
| Do | 14 | 50 | 1,731 | 2,615 |
| Do | 15 | 40 | 1,824 | 2,816 |

This table shows that the addition of calcined alumina over a certain range and with the same amount of water increased the strength and percentage flow. This table shows that the strength increased as calcined alumina was added up to 15% by weight of cement. When calcined alumina was added in this amount, however, the flow or placeability of the mixture was 40%, or it had the same value as the control mixture. The flow value, however, started to decrease when the calcined alumina amounted to 8 or 9% by weight of cement. There is thus a range of proportions of calcined alumina to cement in which one may select any particular proportion, depending upon the results desired. Thus, if maximum flow is desired, proportions in the neighborhood of 5 to 7% by weight of calcined alumina to cement should be used. If, however, greater strength is required and flow is not an especially desired characteristic, then the calcined alumina can be added up to 15%. Increased flow can, of course, be obtained by adding water, but, as is well known, this will affect adversely the strength of the concrete.

I have also added calcined alumina to concrete, i.e., Portland cement, sand, gravel, and water, and I have found that the same improved results are obtained when alumina is added to these mixtures as are obtained when alumina is added to Portland cement alone or to mixtures of sand and Portland cement. The results of tests on the addition of calcined alumina to concrete are set out in the table below. In making these tests, I used mixtures prescribed by Committee 613 of the American Concrete Institute in a report entitled "Recommended Practice for Selecting Proportions for Concrete." To these prescribed mixtures, I added calcined alumina as set out in the table and tested only the mixtures containing the alumina. In the table below, the figures under the columns headed "Rec." are the quantities of raw materials specified by the committee of the American Concrete Institute to obtain the slump and strength characteristics indicated. The figures under the columns headed "Test" are the compositions which I made and tested and the results which I obtained from my tests.

TABLE IV

TEST NO. 1

| | Rec. | Test |
|---|---|---|
| Cement lbs | 590 | 590 |
| Sand lbs | 1,350 | 1,350 |
| ¾" Crushed Rock lbs | 1,850 | 1,850 |
| Water gals | 37.5 | 24.3 |
| Al₂O₃ lbs | None | 35 |
| Slump inches | 4 | 2 |
| 28 Day Strength lbs./sq. in | 3,200 | 5,000 |

TEST NO. 2

| | | |
|---|---|---|
| Cement lbs | 517 | 517 |
| Sand lbs | 1,450 | 1,450 |
| ¾" Gravel lbs | 1,950 | 1,950 |
| Water gals | 33 | 22 |
| Al₂O₃ lbs | None | 35 |
| Slump inches | 4 | 2.5 |
| 28 Day Strength lbs./sq. in | 2,500 | 4,685 |

TEST NO. 3

| | | |
|---|---|---|
| Cement lbs | 590 | 590 |
| Sand lbs | 1,500 | 1,500 |
| Shot Gravel lbs | 1,900 | 1,900 |
| Water gals | 37.5 | 27 |
| Al₂O₃ lbs | None | 35 |
| Slump inches | 4 | 1 |
| 28 Day Strength lbs./sq. in | 2,800 | 6,497 |

TEST NO. 4

| | | |
|---|---|---|
| Cement lbs | 590 | 590 |
| Sand lbs | 1,300 | 1,300 |
| ¾" Gravel lbs | 1,900 | 1,900 |
| Water gals | 38 | 33 |
| Al₂O₃ lbs | None | 35 |
| Slump inches | 5 | 5 |
| 28 Day Strength lbs./sq. in | 2,700 | 3,790 |

It will be noted that in each test the strength of the concrete was very materially increased, although the gravel portions of the aggregates in the mixtures differed in size and type. It will also be noted that the amount of water required was materially decreased and also that the "slump" was decreased. In spite of the fact that the water was decreased and the slump figure decreased when calcined alumina was added to the mixtures (except in one instance in which the slump figure was maintained), which normally would indicate a decrease in workability, I found that, in each mixture using alumina, the workability of the mixture was not affected. Moreover, the increased strengths obtained through the use of alumina were considerably higher than would have been expected if the slump of the recommended mixes without alumina were made the same as those which were obtained by the addition of alumina in the test mixes. This is shown from Test No. 4 in which the slump figures were the same but in which the strength of the mix to which alumina had been added was considerably greater than the strength of the recommended mix without alumina.

I have also tested the effect of adding alumina to conventional wall plaster by plastering three houses with a conventional wall plaster mix (gypsum, 100 pounds, and pearlite, 2 cubic feet). To this conventional mix and before adding water, I added alumina in the proportion of 6% by weight of the gypsum. I found that the addition of the alumina reduced the water which would be required for a mix without alumina by approximately 25 to 30%. The result was that the houses in which the plaster was installed were ready for finishing 30% sooner than would have been the case if conventional plasters had been used.

Calcium aluminate is used as a refractory cement, as a mortar for holding refractory bricks together in a furnace, for the plugging of holes or the repairing of holes formed in a refractory lining of a furnace during use and, when mixed with an aggregate, as a castable for special heat-resistant shapes. I prepared a mixture of calcium aluminate and calcined alumina in the proportion of 6% by weight of alumina to the calcium aluminate and found that, when the alumina was mixed with the calcium aluminate, it was possible to reduce the amount of water required to obtain the desired flow characteristics by 25%. From this reduction in water, it can be expected that the mixture of calcium aluminate and alumina will produce less shrinkage and therefore less cracking than a cement of calcium aluminate alone. Likewise, the mixture of calcium aluminate and alumina will have a higher density and therefore a greater strength than a mortar or castable made of calcium aluminate alone.

While I do not understand the exact nature of the action of the calcined alumina in cements containing calcium, it is clear that such additions in the proportions described have important results. The alumina increases the strength of the mixture containing the calcium cement if the proportion of water to cement is kept the same. The strength is even further increased if the water is decreased. If the proportion of water remains the same and if alumina is added, the flow or placeability of the cement is increased.

It is generally agreed that, where in any given mix the quantities of cement and aggregate remain the same, any increased strength obtained is due to increased density and that increased density in turn is due to a decrease in the amount of water used in the mix. Under such circumstances, the increased density will also produce increased heat conductivity in the concrete formed after the mix has set. In tests on experimental floor slabs, I have found that the heat conductivity of concrete is increased by the addition of calcined alumina. I attribute this to the fact that the addition of calcined alumina to calcium-containing cements decreases the quantity of water required for a concrete mix having the desired floor characteristics.

While I have described certain presently preferred embodiments of my invention, it is to be understood that it may be otherwise embodied within the scope of the appended claims. In these claims, I have described my invention in terms of the active ingredients of the mixture, but it will be understood to those skilled in the art that these ingredients can be used alone or with any of the aggregates described above.

I claim:
1. A water hardening mixture consisting essentially of a water hardening, calcium containing cement and calcined alumina, the alumina being in the proportions of 2 to 15 percent by weight of the cement.
2. A water hardening mixture consisting essentially of Portland cement and calcined alumina, the alumina being in the proportions of 2 to 15 percent by weight of the cement.
3. A water hardening mixture consisting essentially of a calcium containing, heat resistant cement and calcined alumina, the alumina being in the proportions of 2 to 15 percent by weight of the cement.
4. A water hardening mixture consisting essentially of a calcium containing plaster and calcined alumina, the alumina being in the proportions of 2 to 15 percent by weight of the cement.

References Cited in the file of this patent

UNITED STATES PATENTS

| | | |
|---|---|---|
| 848,439 | Buchner | Mar. 26, 1907 |
| 1,541,220 | Hutchins | June 9, 1925 |
| 1,553,105 | Power | Sept. 8, 1925 |
| 1,633,790 | Lindstrom | June 28, 1927 |
| 1,744,547 | Hasselback | Jan. 21, 1930 |

OTHER REFERENCES

"Handbook of Chemistry," Lange, 8th ed. 1952, page 196.